United States Patent
Kuo et al.

(10) Patent No.: US 9,037,716 B2
(45) Date of Patent: May 19, 2015

(54) SYSTEM AND METHOD TO MANAGE A POLICY RELATED TO A NETWORK-BASED SERVICE

(75) Inventors: Richard Kuo, Mountain View, CA (US); James Fan, San Ramon, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1083 days.

(21) Appl. No.: 12/543,841

(22) Filed: Aug. 19, 2009

(65) Prior Publication Data

US 2011/0047274 A1 Feb. 24, 2011

(51) Int. Cl.
| | |
|---|---|
| G06F 15/173 | (2006.01) |
| G06F 17/00 | (2006.01) |
| G06F 9/46 | (2006.01) |
| G06F 15/16 | (2006.01) |
| G06F 13/00 | (2006.01) |

(52) U.S. Cl.
CPC .............. *G06F 15/173* (2013.01); *G06F 13/00* (2013.01); *G06F 17/00* (2013.01)

(58) Field of Classification Search
CPC .. H04L 29/08171; H04L 63/20; G06F 21/604
USPC ....................................................... 709/226
See application file for complete search history.

(56) References Cited

U.S. PATENT DOCUMENTS

| | | | | |
|---|---|---|---|---|
| 6,167,445 | A * | 12/2000 | Gai et al. ........................ | 709/223 |
| 7,076,562 | B2 * | 7/2006 | Singhal et al. ................. | 709/232 |
| 7,548,976 | B2 | 6/2009 | Bahl et al. | |
| 7,561,586 | B2 | 7/2009 | Wang et al. | |
| 7,571,237 | B2 | 8/2009 | Pfitzmann | |
| 7,573,862 | B2 | 8/2009 | Chambers et al. | |
| 8,595,787 | B2 * | 11/2013 | Riley et al. ........................ | 726/1 |
| 2002/0091636 | A1* | 7/2002 | Carroll Bullard ............... | 705/40 |
| 2003/0005112 | A1* | 1/2003 | Krautkremer .................. | 709/224 |
| 2005/0086197 | A1* | 4/2005 | Boubez et al. ..................... | 707/1 |
| 2006/0010445 | A1* | 1/2006 | Peterson et al. ............... | 718/100 |
| 2007/0106808 | A1* | 5/2007 | Vemula et al. ................. | 709/230 |
| 2008/0195360 | A1 | 8/2008 | Chiang et al. | |
| 2009/0019163 | A1* | 1/2009 | Pecus ............................. | 709/226 |
| 2009/0083087 | A1 | 3/2009 | Wolter et al. | |
| 2009/0172757 | A1* | 7/2009 | Aldrey et al. .................. | 725/110 |

* cited by examiner

*Primary Examiner* — Phuoc Nguyen
*Assistant Examiner* — Kishin G Belani
(74) *Attorney, Agent, or Firm* — Akerman LLP; Michael K. Dixon; Roy P. Zachariah, Jr.

(57) ABSTRACT

A method of managing a policy related to a network-based service can include receiving a policy request at a policy creation system from a service creation and development (SCD) system, the request identifying a network-based service. The method can also include developing a policy template related to the network-based service based on requirements of a service level agreement associated with the network-based service. The method can also include sending the policy template to the SCD system after verifying that the policy template meets the requirements of the service level agreement.

19 Claims, 4 Drawing Sheets

SYSTEM AND METHOD TO MANAGE A POLICY RELATED TO A NETWORK-BASED SERVICE

FIELD OF THE DISCLOSURE

The present disclosure generally relates to communications networks, and more particularly relates to systems and methods to manage a policy related to a network-based service.

BACKGROUND

A service provider can provide various network-based services. The service provider can implement a service policy, for example, to meet the service's service level agreement, to prevent misuse of the service, to tie service levels to a payment scale, or for other reasons. As the enterprise offers increasing numbers of service bundles to an increasing population, policy creation can become more challenging.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed systems, methods and computer-readable media. Moreover, some statements may apply to some inventive features but not to others.

In the description below, a flow-charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Figure 1:
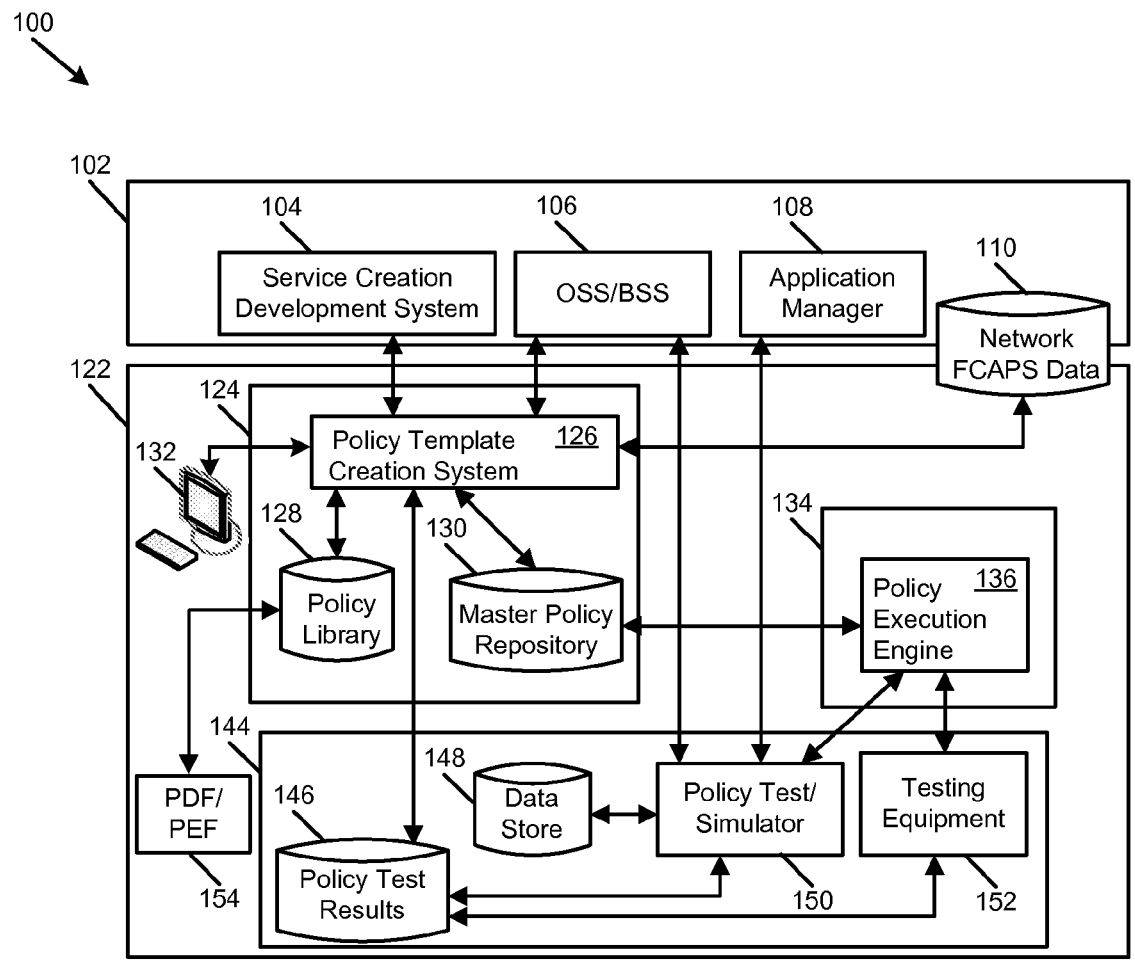
FIG. 1 is a block diagram illustrating a particular embodiment of a system to manage a policy related to a network-based service.

Also, the use of "a" or "an" is employed to describe elements and components described herein. This is done merely for convenience and to give a general sense of the scope of the invention. This description FIG. 1 illustrates a particular embodiment of a system 100 to manage a policy related to a network-based service. The system 100 can include an external policy touchpoint environment 102 and a policy creation, validation and maintenance environment 122. The external policy touchpoint environment 102 can include a service creation and development (SCD) system 104 and an operations support system and business support system (OSS/BSS) server 106. Additionally, the external touchpoint environment 102 can include an application manager 108 and a network Fault, Configuration, Accounting, Performance and Security (FCAPS) data store 110. In an embodiment, the network FCAPS data store 110 can include a distributed system having components in the external touchpoint environment 102 and the policy creation, validation and maintenance environment 122.

The policy creation, validation and maintenance environment 122 can include a policy creation and maintenance environment 124 that can include a policy template creation system 126 that communicates with the SCD system 104 and the OSS/BSS server 106. The policy template creation system 126 can also communicate with a policy library 128 and a master policy repository 130. The policy creation, validation and maintenance environment 122 can also include policy execution environment 134 that can include a policy execution engine 136. The policy execution engine 136 can communicate with the master policy repository 130.

In addition, the policy creation, validation and maintenance environment 122 can include a policy testing environment 144 that can include a policy test results store 146 communicating with the policy template creation system 126. The policy testing environment 144 can also include a data store 146 that stores, for example, data related to service subscriptions, product catalog information, information related to customer devices through which a service is used (e.g., set-top boxes, cellular phones, Internet routers, etc.), network topology information, other information related to network-based services, or any combination thereof. The policy testing environment 144 can also include a policy test simulator system 150 and testing equipment 152, which can communicate with the policy execution engine 136.

Further, the policy creation, validation and maintenance environment 122 can include a user terminal 132 or other computing system that can communicate with the policy template creation system 126. The policy creation, validation and maintenance environment 122 can also include a policy decision function and policy execution function (PDF/PEF) system 154 that can communicate with the policy library 128.

In a particular illustrative embodiment, a plurality of policy templates can be stored at the policy library 128, the master policy repository 130, or a combination thereof. These policy templates can be populated, modified, otherwise manipulated, or any combination thereof, as needed for a network-based service offered by a service provider. In one example, the policy creation system 126 can retrieve an existing policy from a PDF, PEF or any combination thereof, at the PDF/PEF system 154 and store the policy as a policy template in the policy library 128, the master policy repository 130, or any combination thereof. A user may access these templates via the terminal 132 in order to standardize the policy templates or otherwise make the policy templates more suitable for creating a new policy. For instance, the user can modify a template, abstract a template, link templates, create a parent-child relationship or other relationship between templates, cause a template to conform to a pre-defined standard, language or format, or any combination thereof.

The SCD system 104 can receive data identifying a network-based service to be offered by a service provider. It is to be understood that the term "service," as used herein, can include a network-based service or a service bundle. A service can include providing a physical item, such as a cellular phone, set-top box device, other physical good, or any combination thereof, that is to be used with a network-based service. Some providers may refer to a network-based service as a "product," in which case the term "product" can be used in place of the term "service."

The SCD system 104 can send a policy request to the policy template creation system 126 for generation of a policy template related to the network-based service. The policy request can include service information associated with the network-based service, such as an identifier of the network-based service, whether the network-based service has previously been offered, a portion of a service level agreement related to the network-based service, cost information, other service information, or any combination thereof. For instance, the SCD system 104 can deliver a policy request including service information to the policy creation system 126 via an application programming interface (API) that triggers creation of a new policy template at the policy creation system 126.

The policy creation system 126 receives a policy request from the SCD system 104. The policy creation system can also receive operational information related to the network-based service from the OSS/BSS system 106, such as marketing information, ordering information, billing information, business rule information, other information related to the service, or any combination thereof. In one example, the policy creation system 126 can receive the information from the OSS/BSS system 106 via an API.

After receiving the policy request from the SCD system 104, the policy creation system 126 can check for a pre-existing policy template corresponding to the network-based service at the policy library 128, the master policy repository 130, or a combination thereof. In one embodiment, the policy creation system 126 can map each element of the network-based service to a policy template stored at the policy library 128. For instance, where the network-based service includes a plurality of bundled services, the policy creation system 126 can map each of the bundled services to a corresponding policy template. In one embodiment, the policy creation system 126 can prompt a user to perform the mapping via the terminal 132. For instance, the user may use a drag and drop feature of a graphical user interface to map each service to a policy template. In another embodiment, a rules engine at the policy creation system 126 can perform the mapping process automatically.

The policy creation system 126 can receive network performance data from the network FCAPS data store 110 and can adjust mapping results based on the performance data. For instance, the policy creation system 126 can develop or fine-tune a policy template to be in line with network capacity planning strategies.

The policy creation system 126 can receive policy test results related to pre-existing policy templates and can modify a particular policy template based on the policy test results, such that the particular policy template conforms to standards associated with the network-based service, such as a service level agreement associated with the network-based service.

The policy template creation system 126 can create a policy template for the network-based service, based on by developing a new policy template, using a pre-existing policy template, modifying a pre-existing policy template, or any combination thereof. The policy template can include, for example, a quality of service (QoS) policy, an access control policy, a security policy, a customer billing policy, a service disruption policy, another policy, or any combination thereof. A policy template can be created in multiple versions. For instance, the policy creation system 126 can create a policy template in different languages or otherwise tailored to a local subscriber population.

The policy template for the network-based service can be stored at the master policy repository 130. In addition, the policy template creation system 126 can send the policy to the SCD system 104, where it can be stored in a product catalog. In one embodiment, the SCD system 104 can send a stored policy template related to a network-based service to the policy creation system 126 with the policy template request, and the policy creation system 126 can create the new policy template using the stored policy template.

Though policy template creation has been described with reference to a network-based service offering, policy template creation or modification at the policy creation system 126 can be triggered by an event other than a network-based service offering. For example, a policy template can be created or modified in response to a request sent from the SCD system 104 to the policy creation system 126, indicating a business rule change (such as billing, marketing or ordering process changes) associated with a service offered by the service provider. In another example, the application manager 108 can send a request indicating a real-time or other temporary service change to the policy creation system 126, and the policy creation system 126 can create a temporary policy related to the temporary service change. A temporary service change can include, for instance, a temporary bandwidth increase (bandwidth on demand), a video on demand order, or another service change.

After a new policy template is created, it can be verified via the policy testing environment 144 to ensure it meets the product's Service Level Agreement (SLA) and performance requirements. The policy testing environment 144 can include a portion of a network used to provide the network-based service, a portion of a lab network, a portion of a simulated network, or any combination thereof.

In one embodiment, the policy test simulator 150 can receive a sample of subscription database information, product catalog information, device information, topology data (SPDT), other information related to providing the network-based service to subscribers via a network, or any combination thereof. For a subscription-based service, a trigger can be sent from the OSS/BSS system 106 to the policy test simulator 150. For a transaction-based service, a trigger can be sent from the application manager 108. In another embodiment, the policy test simulator 150 can be equipped with scripting capabilities to enable test engineers to simulate a live subscription order or a transactional service.

When a trigger is received or generated at the policy test simulator 150, the policy test simulator 150 can send a testing request to the policy execution engine 136, which can be, for example, an enterprise policy decision function (e-PDF) or a local policy decision function for a small system. The e-PDF or local PDF can fetch a previously mapped set of policy templates from the master policy repository 130 and execute the policy or push them to a distributed PDF/PEF at the testing equipment 152 for execution.

Testing results can be collected at the policy testing results repository 146. An outcome from a test can be stored and analyzed at the policy creation system 126 and compared to desired results. If the test outcome does not meet desired results, the new policy template can be modified for retest.

In a particular embodiment, the policy creation system can assign a "state" to a policy in a stage of its lifecycle, to improve the manageability. Examples of a state include New, Ready-to-Deploy, Active, Re-evaluate, Inactive and Ready-to-Retire. For instance, when a policy template is first built, it can be assigned with a New state. After passing a testing procedure successfully, the policy template can be assigned a Ready-to-Deploy state. When a policy is used in the production environment, it can be assigned an Active state.

In addition, the effectiveness of a policy template can be tracked and analyzed against a predefined set of standards. When a policy template does not meet the standards, the policy template can be assigned a Re-evaluate state, and a user can be alerted via the terminal 132, for example, to modify the policy. The policy state can be changed to Ready-to-Deploy after such modification. A policy may be assigned an Inactive state, for example, due to failure during testing. An obsolete policy can be assigned a Ready-to-Retire state, and the policy can be archived.

Figure 2:
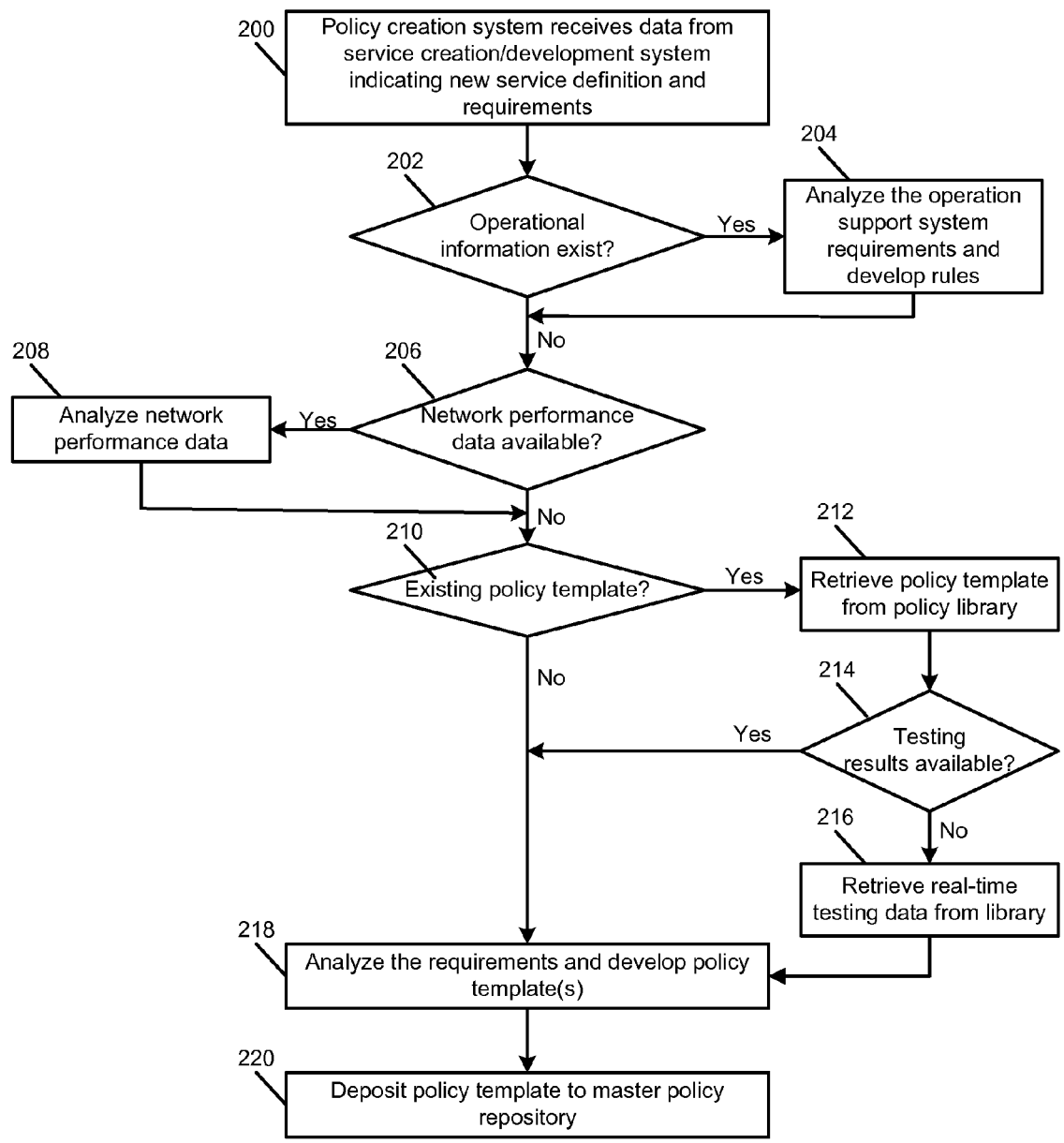
FIG. 2 is a flow diagram illustrating a particular embodiment of a method of managing a policy related to a network-based service.

FIG. 2 illustrates a particular embodiment of a method of managing a policy related to a network-based service. At block 200, a policy creation system can receive data from a service creation and development system indicating a definition and requirements of a network-based service offering. Moving to decision node 202, the policy creation system can determine whether operational information exists for the network-based service. If so, the method proceeds to block 204, and the policy creation system can analyze requirements from an OSS/BSS system. Continuing to decision node 206, the policy creation system can determine whether network performance data related to the network-based service is available. If so, the method advances to block 208, and the policy creation system can analyze network performance data from a network FCAPS data store.

At decision node 210, the policy creation system can determine whether an existing policy template at a policy library, for example, relates to the network-based service. If so, the method moves to block 212, and the policy creation system can receive the existing policy template from the policy library. In addition, the policy creation system can determine, at decision node 214, whether testing results related to the existing policy template are stored at a policy test results repository. If so, the method proceeds to block 216, and the policy creation system can receive the resting results.

Continuing to block 218, the policy creation system can develop a policy template for the network-based service based on requirements received from the service creation and development system. The developed policy template can include an existing policy template, a new policy template, a modified existing policy template, or any combination thereof. A new policy template can include a policy template created for the network-based service, automatically via a rules engine or manually by a policy creator, based on service requirements, operational information, network performance data, other information, or any combination thereof. Advancing to block 220, the policy creation can store the developed policy at a master policy repository.

Figure 3:
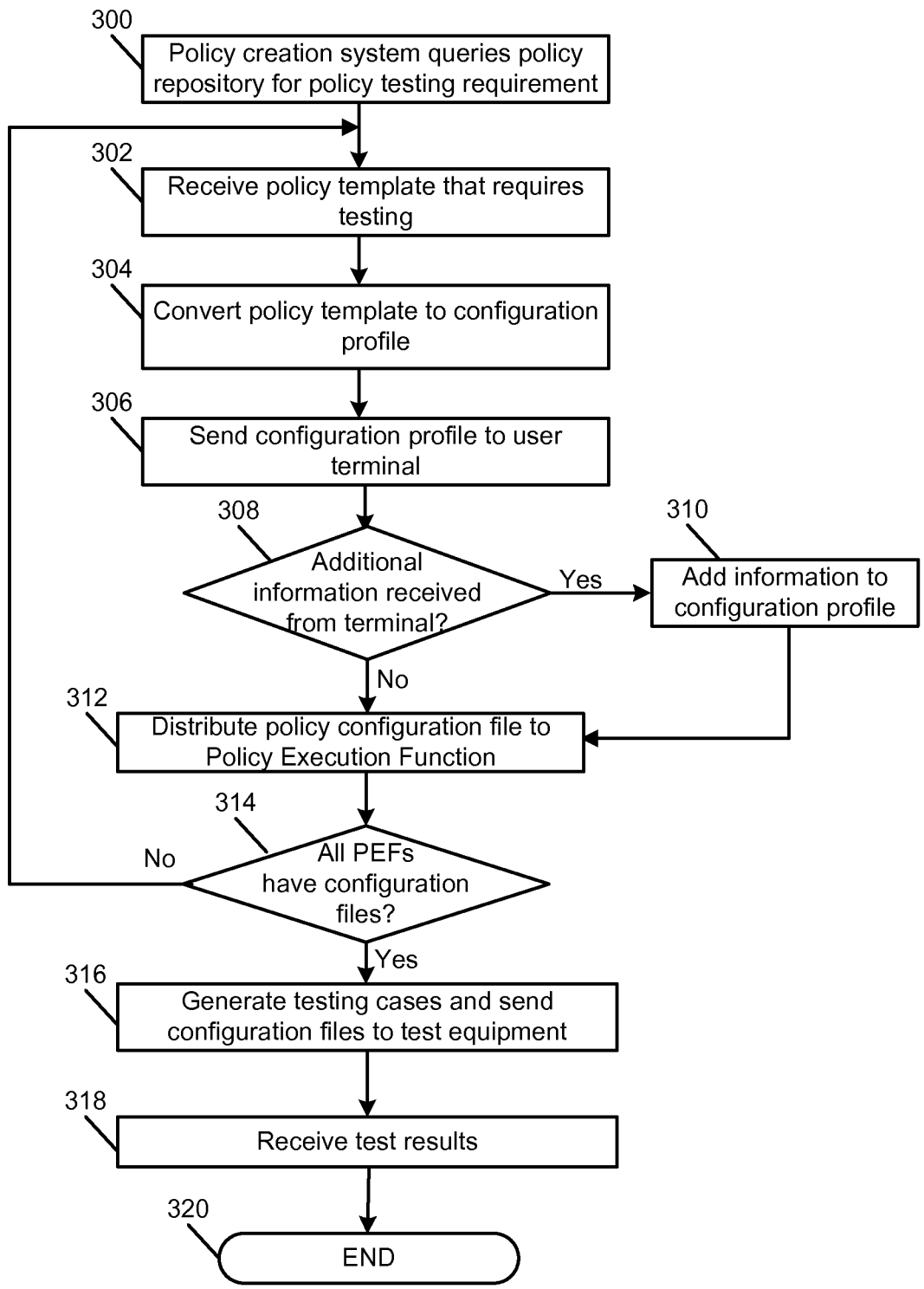
FIG. 3 is a flow diagram illustrating another particular embodiment of a method of managing a policy related to a network-based service.

FIG. 3 illustrates another particular embodiment of a method of managing a policy related to a network-based service. At block 300, a policy creation system can query a policy repository, such as the policy library 128 or master policy repository 130 in FIG. 1, for a policy template that is ready to test. In an example, the policy creation system can automatically query the policy repository after creation of a policy template or after a threshold number of policy templates have been created. In another example, the policy creation system can query the policy repository in response to a command from a user terminal, such as the user terminal 132 illustrated in FIG. 1.

Moving to block 302, the policy creation system can receive a policy template that is to be tested. Proceeding to block 304, the policy creation system can convert the policy template to a configuration profile. The configuration profile can include attributes, such as a committed rate related to a service, a peak rate related to the service, an access control list related to the service, a uniform resource locator (URL) redirect related to the service, another attribute or any combination thereof. Continuing to block 306, the policy creation system sends the configuration profile to a user terminal, such as the terminal 132 in FIG. 1.

At decision node 308, the policy creation system can determine whether additional information related to the configuration profile is received from the user terminal. If so, the method moves to block 310, and the information is added to the configuration profile. Proceeding to block 312, the policy creation system distributes the configuration profile to a policy execution function (PEF) ready to be verified.

Continuing to decision node 314, the policy creation system determines whether all PEFs have configuration files. After all the PEFs have configuration files, the method advances to block 316, and the policy creation system can generating testing cases, where each testing case includes a policy configuration file, and can send the testing cases to test equipment. At block 318, the policy creation system can receive test results from the test equipment or from a test results repository communicating with the test equipment. The method terminates at 320.

Figure 4:
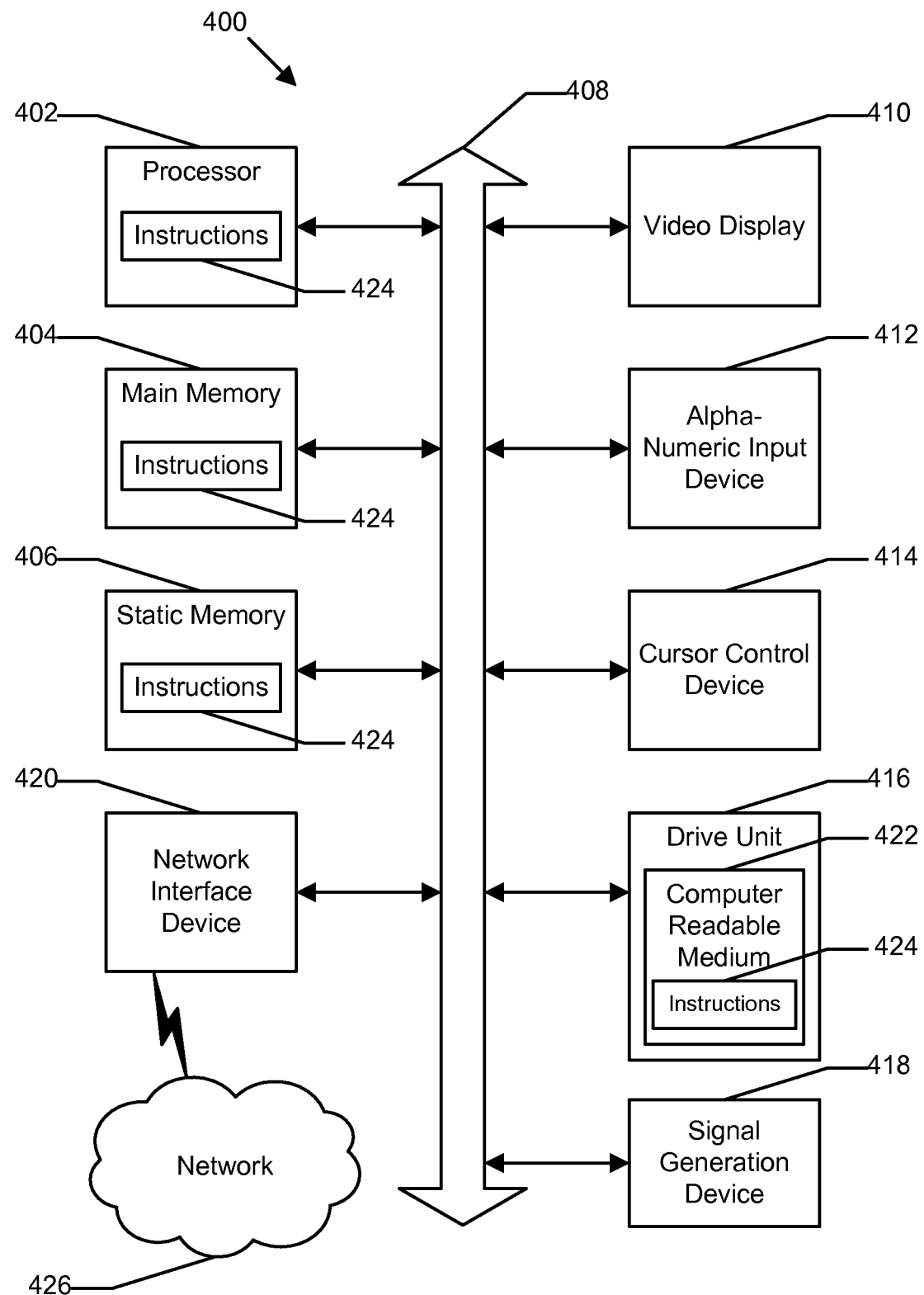
FIG. 4 is a block diagram of a particular embodiment of a general computing system.

FIG. 4 shows an illustrative embodiment of a general computer 400 including a set of instructions that can be executed to cause the computer system to perform any one or more of the methods or computer based functions disclosed herein. The computer system 400 may operate as a standalone device or may be connected, such as using a network, to other computer systems or peripheral devices. In an illustrative embodiment, such standalone and peripheral devices can include, for example, servers, databases, testing equipment, other network elements, or any combination thereof, as illustrated in FIG. 1.

In a networked deployment, the computer system 400 may operate in the capacity of a server or as a client user computer in a server-client user network environment, or as a peer computer system in a peer-to-peer (or distributed) network environment. The computer system 400 can also be implemented as or incorporated into various devices, including, for instance, user devices adapted to send a service request, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, such as a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (such as TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Many different aspects and embodiments are possible. Some of those aspects and embodiments are described below. After reading this specification, skilled artisans will appreciate that those aspects and embodiments are only illustrative and do not limit the scope of the present invention.

According to a first aspect, a method of managing a policy related to a network-based service can include receiving a policy request at a policy creation system from a service creation and development (SCD) system, the request identifying a network-based service. The method can also include developing a policy template related to the network-based service based on requirements of a service level agreement associated with the network-based service. The method can also include sending the policy template to the SCD system after verifying that the policy template meets the requirements of the service level agreement.

In an embodiment of the first aspect, the method can include sending the policy template to a policy library or master policy repository. In another embodiment of the first aspect, developing the policy template includes prompting a user via a user terminal to create the policy template and receiving the policy template via the user terminal. In a further embodiment of the first aspect, developing the policy template includes automatically creating the policy template at the policy creation system via a rules engine.

In another embodiment of the first aspect, the method can include receiving operational information from an operations support system/business support system (OSS/BSS) server and developing rules based on the operational information. The policy template can be developed based on the rules.

In another embodiment of the first aspect, the method can include receiving network performance information from a network performance data store and developing rules based on the network performance information. The policy template can be developed based on the rules.

In another embodiment of the first aspect, the method can include receiving a pre-existing policy template from a policy library, a master policy repository, or a combination thereof, wherein the policy template includes the pre-existing policy template. In another embodiment of the first aspect, the method can include populating the pre-existing policy template, modifying the pre-existing policy template, or a combination thereof.

In another embodiment of the first aspect, the method can include, before receiving the policy request, retrieving a pre-existing policy from a policy decision function, a policy execution function, or any combination thereof, and storing the pre-existing policy as a pre-existing policy template at the policy library, the master policy repository, or a combination thereof.

In another embodiment of the first aspect, the method can include providing the pre-existing policy template to a user terminal; receiving a modification, an abstract, a link, a relationship, another version, or any combination thereof, related to the pre-existing policy template; and storing the pre-existing policy as the pre-existing policy template.

According to a second aspect, a system to manage a policy related to a network-based service can include a policy creation system adapted to receive a policy request at a policy creation system from a service creation and development (SCD) system, the request identifying a network-based service. The system can also be adapted to develop a policy template related to the network-based service based on requirements of a service level agreement associated with the network-based service. The system can also be adapted to send the policy template to the SCD system after verifying that the policy template meets the requirements of the service level agreement.

In an embodiment of the second aspect, the policy request can include an identifier of the network-based service, information indicating whether the network-based service has previously been offered, a portion of a service level agreement related to the network-based service, cost information, or any combination thereof.

In another embodiment of the second aspect, the policy creation system can be adapted to receive the policy request from the SCD system via an application programming interface (API), wherein the API automatically triggers creation of the policy template at the policy creation system.

In another embodiment of the second aspect, the policy template can be based on operational information received from an OSS/BSS server via an API.

In another embodiment of the second aspect, the operational information can include marketing information, ordering information, billing information, business rule information, or any combination thereof.

According to a third aspect, a computer-readable medium including processor-readable instructions that are executable by a processor to perform a method. The method can include receiving a policy request at a policy creation system from a service creation and development (SCD) system, the request identifying a network-based service. The method can include developing a policy template related to the network-based service based on requirements of a service level agreement associated with the network-based service. The method can include testing the policy template. The method can include sending the policy template to the SCD system after verifying that the policy template meets the requirements of the service level agreement.

In an embodiment of the third aspect, testing the policy template can include converting the policy template to a configuration profile and sending the configuration profile to a policy execution function (PEF).

In another embodiment of the third aspect, the method can include, before sending the configuration profile to the PEF, sending the configuration profile to a user terminal and adding information received via the user terminal to the configuration profile.

In another embodiment of the third aspect, the method can include generating a test case related to the policy template; sending the configuration file to a policy testing environment; receiving test results; and comparing the test results to the requirements of the service level agreement.

In an embodiment of the third aspect, the method can include determining that a plurality of PEFs have received configuration files before sending the configuration file to the testing environment.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of managing a policy related to a network-based service, the method comprising:
receiving, from a service creation and development system, a policy request at a policy creation system, the policy request identifying a network-based service, the network-based service comprising a plurality of bundled services;
developing, by utilizing instructions from memory that are executed by a processor, a policy template related to the network-based service based on requirements of a service level agreement associated with the network-based service, wherein developing the policy template includes mapping each bundled service to the policy template;
testing the policy template, wherein testing the policy template includes:
converting the policy template to a configuration profile, the configuration profile including a uniform resource locator redirect related to the network-based service; and
sending the configuration profile to a policy execution function;
sending the policy template to the service creation and development system after verifying that the policy template meets the requirements of the service level agreement; and
transmitting an alert modify a policy associated with the policy template when an effectiveness of the policy template does not meet a standard, wherein a policy state of the policy is adjusted when the effectiveness of the policy template does not meet the standard.

2. The method of claim 1, further comprising sending the policy template to a policy library and master policy repository.

3. The method of claim 1, wherein developing the policy template includes prompting a user via a user terminal to create the policy template and receiving the policy template via the user terminal.

4. The method of claim 1, wherein developing the policy template includes automatically creating the policy template at the policy creation system via a rules engine.

5. The method of claim 4, further comprising receiving operational information from an operations support system/business support system server and developing rules based on the operational information, wherein the policy template is developed based on the rules.

6. The method of claim 4, further comprising receiving network performance information from a network performance data store and developing rules based on the network performance information, wherein the policy template is developed based on the rules.

7. The method of claim 1, further comprising receiving a pre-existing policy template from a policy library and a master policy repository, wherein the policy template includes the pre-existing policy template.

8. The method of claim 7, further comprising populating the pre-existing policy template and modifying the pre-existing policy template.

9. The method of claim 7, further comprising, before receiving the policy request, retrieving a pre-existing policy from a policy decision function and a policy execution function, and storing the pre-existing policy as a pre-existing policy template at the policy library and the master policy repository.

10. The method of claim 9, further comprising:
providing the pre-existing policy template to a user terminal;
receiving a modification, an abstract, a link, a relationship, and another version, related to the pre-existing policy template; and
storing the pre-existing policy as the pre-existing policy template.

11. A system to manage a policy related to a network-based service, the system comprising a policy creation system comprising:
a memory that stores instructions;
a processor that executes the instructions to perform operations, the operations comprising:
receiving, from a service creation and development system, a policy request at the policy creation system, the policy request indentifying a network-based service;
developing a policy template related to the network-based service based on requirements of a service level agreement associated with the network-based service, wherein developing the policy template includes providing the policy template in at least two languages;
testing the policy template, wherein in testing the policy template, the operations further comprise:
converting the policy template to a configuration profile, the configuration profile including an access control list related to the network-based service; and
sending the configuration profile to a policy execution function;
sending the policy template to the service creation and development system after verifying that the policy template meets the requirement of the service level agreement; and
transmitting an alert to modify a policy associated with the policy template when an effectiveness of the policy template does not meet a standard, wherein a policy state of the policy is adjusted when the effectiveness of the policy template does not meet the standard.

12. The system of claim 11, wherein the policy request includes an identifier of the network-based service, information indicating whether the network-based service has previously been offered, a portion of a service level agreement related to the network-based service, cost information.

13. The system of claim 12, wherein the operations further comprise receiving the policy request from the service creation and development system via an application programming interface, wherein the application programming interface automatically triggers creation of the policy template at the policy creation system.

14. The system of claim 11, wherein the policy template is based on operational information received from an operations support system/business support system server via an application programming interface.

15. The system of claim 14, wherein operational information includes marketing information, ordering information, billing information, and business rule information.

16. A non transitory computer-readable medium including processor-readable instructions that are executable by a processor to perform operations, the operations comprising:
receiving, from a service creation and development system, a policy request at a policy creation system, the policy request identifying a network-based service;
developing a policy template related to the network-based service based on requirements of a service level agreement associated with the network-based service, wherein the policy template includes a quality of service policy, an access control policy, a security policy, a customer billing policy, and a service disruption policy for the network-based service;

testing the policy template, wherein the operations further comprise testing the policy template by:
  converting the policy template to a configuration profile, the configuration profile including a committed rate related to the network-based service and a peak rate related to the network-based service; and
  sending the configuration profile to a policy execution function;

sending the policy template to the service creation and development system after verifying that the policy template meets the requirements of the service level agreement; and transmitting an alert to modify a policy associated with the policy template when an effectiveness of the policy template does not meet a standard, wherein a policy state of the policy is adjusted when the effectiveness of the policy template does not meet the standard.

17. The computer-readable medium of claim 16, wherein the operations further comprise, before sending the configuration profile to the policy execution function:
  sending the configuration profile to a user terminal; and
  adding information received via the user terminal to the configuration profile.

18. The computer-readable medium of claim 16, wherein the operation further comprise:
  generating a test case related to the policy template;
  sending the configuration file to a policy testing environment;
  receiving test results; and
  comparing the test results to the requirements of the service level agreement.

19. The computer-readable medium of claim 16, wherein the operations further comprise determining that a plurality of policy execution functions have received configuration files before sending the configuration file to the testing environment.

* * * * *